Jan. 23, 1940.                K. J. DE JUHASZ                2,187,733
VALVE
Filed Jan. 8, 1937
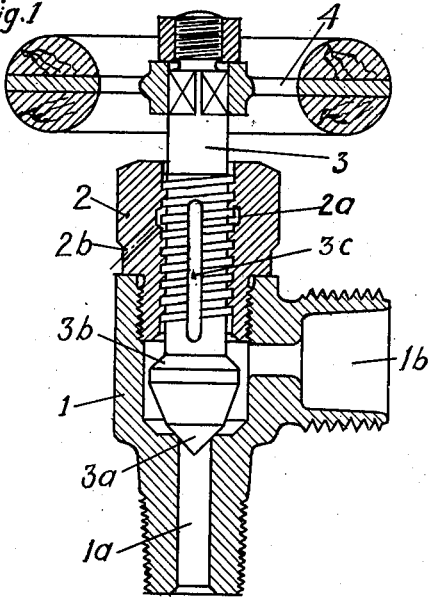
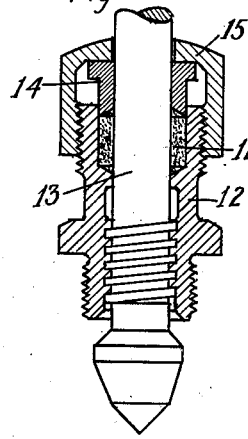
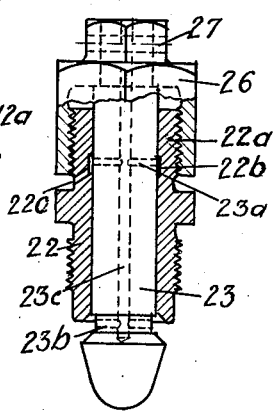
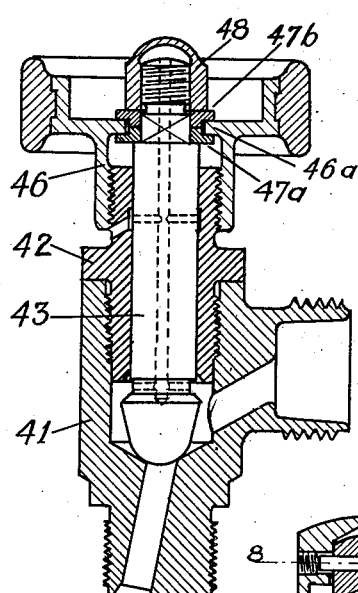
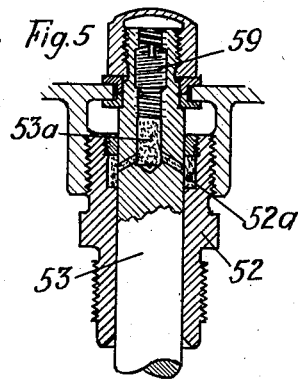
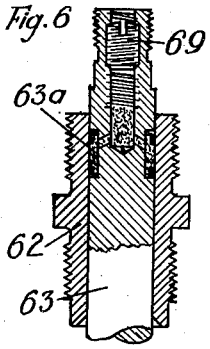
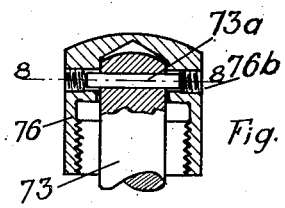
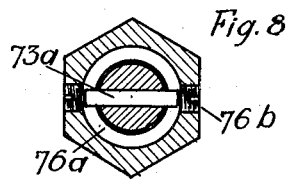
INVENTOR
Kalman John De Juhasz Patented Jan. 23, 1940

2,187,733

UNITED STATES PATENT OFFICE 2,187,733

VALVE

Kalman John De Juhasz, State College, Pa.

Application January 8, 1937, Serial No. 119,569

1 Claim. (Cl. 251—50)

This invention relates to valves for opening or closing the passage for fluids between two spaces, especially under conditions of high pressure and temperature. It relates in particular to indicator valves as used for opening or closing the communication between the pressure indicator and the cylinder of an engine or compressor to be tested. The objects of the improvements are to prevent leakage, to provide possibility of quick opening and closing, to ensure self-locking in both the opened and the closed state, and to provide a possibility of lapping the valve tip to its seat. These and other objects and advantages reside in certain novel features of construction, arrangement and combination of parts as will be hereinafter more fully set forth and pointed out in the appended claim.

Referring to the drawing:

Fig. 1 is a longitudinal section through an indicator valve without packing exemplifying the prior art.

Fig. 2 is a longitudinal section through the bonnet and spindle assembly of a valve with packing means exemplifying the prior art.

Fig. 3 is a longitudinal section through the bonnet and spindle assembly of an indicator valve according to the present invention.

Fig. 4 is a longitudinal section of an indicator valve without packing means according to the present invention.

Fig. 5 is a longitudinal section through the bonnet and spindle assembly of a valve with packing means according to the present invention.

Fig. 6 is a longitudinal section through the bonnet and spindle assembly of a valve with another kind of packing means according to the present invention.

Fig. 7 is a longitudinal section and Fig. 8 is the cross section 8—8 through the spindle and lifting nut of a valve according to the present invention showing another type of connection between spindle and lifting nut.

Indicator valves according to the prior art, as illustrated in Fig. 1, comprise a body 1, the lower end 1a of which is screwed into the engine cylinder, and to the other opening 1b is fastened the pressure indicator by means of a suitable cone and nut connection. Into the body is screwed the bonnet 2. The inside of the bonnet is threaded to receive the threaded spindle 3 the upper end of which spindle is fitted with the grip wheel 4 for turning, and thereby raising or lowering the spindle. The lower tip of the spindle is shaped as the valve proper having an upper 3b and lower 3a cone-shaped surface. In its lowermost position of the spindle, as it is represented in Fig. 1, the cone seats on the opening of the body thus closing the passage through 1a. In its uppermost position the valve seats with its cone 3b upon the lower end of the bonnet thus establishing communication between the spaces attached to 1a and 1b and preventing escape of fluid through the clearance between the male threads of the spindle and the female threads of the bonnet.

In indicator valves, in the closed (lowermost) position of the valve, the indicator fastened to 1b must be in communication with a third space, usually the atmosphere, in order that the atmospheric line may be drawn in the indicator diagram. This is accomplished by a groove 3c milled on the spindle, and by a circular groove 2a and hole 2b provided in the bonnet. When the valve is between its two extreme positions then fluid can escape from 1a to the atmosphere which is ordinarily not desired because it heats up the spindle and destroys the lubricating film on it. In order to reduce these deleterious effects the opening and closing operation should be accomplished as rapidly as possible.

Fig. 2 shows a bonnet and spindle construction according to prior art for other than indicating purposes. In this case the possibility of opening and closing the passage between 1a and 1b openings of the body has to be provided for. Leakage of the fluid into the atmosphere, especially in case of noxious gases must be prevented. This is accomplished by means of packing comprising the packing chamber 12a formed in the bonnet 12 and surrounding the spindle 13. The packing material in the packing chamber 12a is covered by the packing gland 14 and it is pressed down by the packing nut 15.

These constructions according to the prior art as exemplified in Figs. 1 and 2 have the following faults and disadvantages:

(1) The threads on the spindle do not provide a reliable guidance for the valve proper for its alinement with its seats.

(2) The flow of hot fluid through the groove 3c tends to destroy the lubrication of the threads which results in a liability of jamming of the spindle in its open or closed position, and in rapid wear.

(3) For self-locking of the spindle in its upper or lower position a small helix angle for the threads is necessary, involving a small pitch in consequence of the small diameter of the spindle.

Therefore both the opening and the closing of the valve has to be effected by numerous turns of the grip-wheel thus preventing quick operation.

(4) No lapping-in of the valve to its seat is possible, because the spindle is moved axially when it is rotated.

In the present invention these faults and disadvantages are obviated by a novel construction of the bonnet and the spindle, as shown in Figs. 3-8, the body of the valve 1 remaining essentially similar to the forms used in the prior art.

Referring to Fig. 3 the essential features of my novel construction are first, the smooth (i. e. not threaded) cylindrical spindle 23 which is a sliding fit in the bonnet 22, and has therefore two degrees of freedom, i. e. axial translation and rotation around its axis; second, the separate lifting means consisting of the nut 26 coacting with the threaded outside surface 22a of the bonnet. The spindle 23 and the lifting nut 26 are joined together by the pin 27. The connection with the atmosphere is effected by the holes 23a, 23b and 23c in the spindle and by the annular groove 22b and hole 22c in the bonnet. Referring to Fig. 4, showing the preferred construction according to my invention, a floating connection between the spindle 43 and lifting nut 46 is effected by means of the two shoulder-washers 47a and 47b held to the spindle by the nut 48 the internal flange 46a of the lifting nut being loosely held between the rims of the shoulder-washers 47a and 47b.

The advantages which can be attained by my construction as exemplified in Figs. 3 and 4, as compared with the prior art, are the following:

(1) The cylindrical fit between the spindle and the bonnet provides a reliable alinement of the spindle and the valve proper with its seats.

(2) The flow of hot fluid into the atmosphere takes place through the central bore of the spindle, and does not come into contact with the lubricated surface between the spindle and the bonnet.

(3) The outer surface of the bonnet coacting with the lifting nut is comparatively cool and its lubrication is not affected by the hot gases, therefore it retains its smooth motion and has a long wearing life.

(4) The threads of the bonnet and lifting nut, having a large diameter, can be made of a helix angle small enough for self-locking, and yet of a pitch large enough for quick opening and closing.

(5) Lapping-in of the valve proper to both its seats (upper and lower) is possible, without removing the bonnet from the body. In the construction shown in Fig. 3 only the pin 27 and the nut 26 have to be removed; then the spindle can be moved axially, and rotated around its axis, in the bonnet. In the construction shown in Fig. 4 it is not necessary to remove anything, because the clearance between the rims of the shoulder-washers 47a and 47b, and the internal flange 46a of the lifting nut, allows a sufficient amount of axial motion.

(6) In the construction shown in Fig. 4 the valve proper can come to its seat in any random position; therefore any wear or erosion due to the flow of hot gases is not localized but distributed along the whole contacting surface of the valve. This results in a longer useful life before regrinding becomes necessary.

Fig. 5 shows a bonnet and spindle construction according to the present invention, for other than indicating application, in which no communication with the atmosphere is desired, but on the contrary the utmost freedom from leakage is required. This is attained by a packing provided in the annular recess 52a of the bonnet 52. The spindle 53 is made hollow to provide storage place for the packing material which can be forced by means of the screw 59 into the packing chamber 52a whenever the packing material in the latter is used up and needs replenishment.

Fig. 6 shows another modification of the packing means, the packing chamber being provided in the annular recess 63a of the spindle 63 (instead of in the bonnet as in the case shown in Fig. 5), the method of replenishment of the used up packing being similar (by means of screw 69) to that in Fig. 5.

Other methods than the one shown in Fig. 4 can be adopted for providing a floating connection between the spindle and the lifting nut, for example such as shown in Figs. 7 and 8. In the lifting nut 76 the annular recess 76a is formed which coacts with the pin 73a driven into the spindle 73. The holes in the lifting nut 76 which are necessary for the assembly and disassembly of the pin 73a with the spindle 73 are plugged up by the screws 76b in order to prevent the pin from accidentally falling out.

My drawing shows the invention as applied to elbow type valves but evidently the construction is applicable to any other type of valve, such as normal straight through type, or to bonnets arranged at 45 degrees to the line of flow. My drawing shows only the preferred forms but modification on them may be made without departing from the spirit of my invention or the scope of the appended claim.

I claim:

In a valve, a bonnet member provided with a bore, a stem in said bore, the upper extremity of said bore terminating in a packing recess of greater diameter than said bore, said recess having its outer end closed by a gland member surrounding said stem and threaded in the upper end of said recess, a packing bore in said stem communicating at one extremity with said recess and terminating at its upper extremity in a threaded passage, a threaded plug in said passage, packing in said packing recess and in said packing bore, said threaded plug contacting the packing in said packing bore, whereby turning of said plug will compress the packing in said packing bore and in said packing recess.

KALMAN JOHN DE JUHASZ.